A. DOW.
LOCKING DEVICE FOR DEMOUNTABLE TIRE RIMS.
APPLICATION FILED JAN. 29, 1909.
922,403.
Patented May 18, 1909.
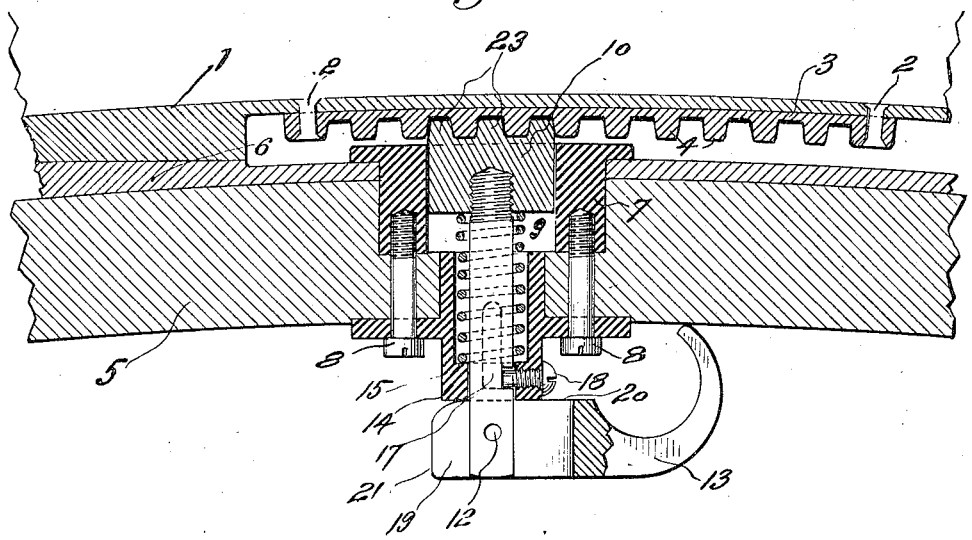
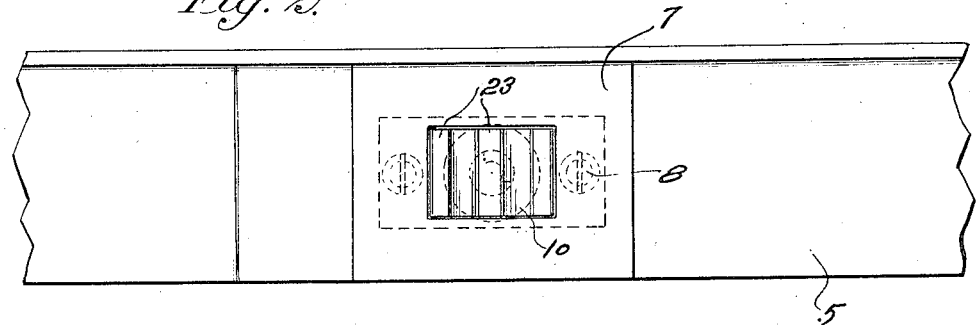
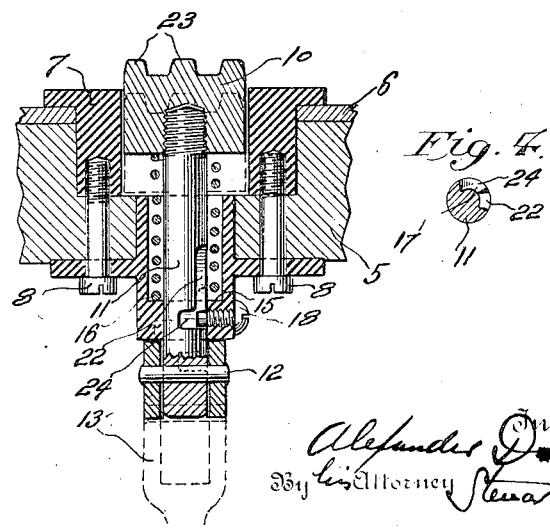

UNITED STATES PATENT OFFICE.

ALEXANDER DOW, OF NEW YORK, N. Y., ASSIGNOR TO DOW RIM COMPANY, A CORPORATION OF NEW YORK.

LOCKING DEVICE FOR DEMOUNTABLE TIRE-RIMS.

No. 922,403.            Specification of Letters Patent.            Patented May 18, 1909.

Application filed January 29, 1909. Serial No. 474,989.

*To all whom it may concern:*

Be it known that I, ALEXANDER DOW, a citizen of the United States of America, residing at New York city, county and State of New York, have invented certain new and useful Improvements in Locking Devices for Demountable Tire-Rims, of which the following is a specification.

My invention relates to an improved locking device for demountable tire rims, and more particularly for tire rims of the character set forth and described in my co-pending application for United States Letters Patent, Serial No. 470,052, filed December 30, 1908. The tire rim of the aforesaid application is slipped laterally over the felly rim and is then given a circumferential movement to bring certain wedges on the tire rim into interlocking engagement with other wedges on the felly rim. To prevent displacement of the tire rim or return circumferential movement of the same, there is in my former invention a spring bolt, carried by the felly, which, when the wedges have been brought into engagement, registers with and enters a pocket or recess in the tire rim.

It is the object of my present invention to design the spring bolt and coöperating device on the tire rim so that the bolt may engage and securely hold the tire rim after the wedges have been moved any desired distance over each other, instead of, as above, after the wedges have been moved one single predetermined distance over each other. By thus providing for a variable locking movement of the rims, no imperfect or mismated wedges can prevent the locking of the rims, and all wear on the wedges can be taken care of.

Having briefly set forth the objects of the invention, an embodiment of the same will now be described in detail in connection with the accompanying drawings, in which:

Figure 1 is an enlarged detail view in vertical cross-section through a section of the tire rim and wheel felly. Fig. 2 is a top plan view of the section of the felly in locking device shown in Fig. 1. Fig. 3 is an enlarged detail view in vertical cross-section through a section of the felly and locking device, shown in Fig. 1, with the bolt operating lever in another position. Fig. 4 is a cross-sectional view of the bolt carrying pin, shown in Figs. 1 and 3.

Referring to the drawings, there is shown conveniently attached to the demountable tire rim 1, as by rivets 2, a rack or gear section, 3, the teeth 4 of which are adapted to be engaged by the bolt. The wheel felly 5 is provided with a rim 6 of the general character shown in my aforesaid previous invention. In a pocket or countersink in the felly rim is seated a casing 7 secured to the felly by bolts or screws 8. The chamber 9 of the casing 7 is preferably rectangular in shape to prevent angular movement therein of the bolt 10. The bolt 10 is movable vertically in the chamber 9 on a pin or shaft 11, on to the end of which the bolt is screwed before placed in position. The shaft 11 extends through the felly to the inner side thereof, and pivoted at 12 near the end of the shaft is a finger lever 13. A sleeve or casing 14 attached to the felly and to the casing 7 by the screws 8 embraces the shaft 11.

Seated within the casing 14 and bearing at one end against a shoulder 15 of the casing, and at the other end against the bolt 10, is a spring 16, which in one position of the finger lever 13 tends to throw the bolt 10 into engagement with the rack 3.

In the surface of the shaft 11 is a right-angle slot 17, which, coöperating with a set screw 18, carried by the casing, forms a bayonet joint. When the bolt 10 is in its uppermost position, as shown in Fig. 1 and in the full lines of Fig. 3, so that the set screw is at the lower end of the slot 17, the finger lever 13 and shaft 11 may be turned at right angles to the position shown in Fig. 1 into the position shown in Fig. 3. When turned into the position shown in full lines in Fig. 3, the finger lever may be turned around its pivot 12 down into the position shown in dotted lines in Fig. 3. The arms 19 of the fork of the finger lever are so designed as to provide a cam action when the lever is turned up and down. The pivot 12 is nearer the surfaces 20 of the arms 19 than it is to the end surfaces 21 of these arms. By virtue of this construction when the lever 13 is turned down, the shaft 11 is likewise drawn down removing the bolt 10 from the rack 3 and compressing the spring 16. During the downward movement of the shaft 11 the set screw 18 travels along the extension 22 of the slot 17. When then the lever 13 is down, the bolt 10 is retracted from the rack 3, and rotary movement of the shaft 11 is prevented by the set screw 18.

The bolt 10 on its outer surface has a set of teeth 23 designed to interlock with the teeth 4 of the rack 3. The rack is of sufficient length to permit the tire rim to be locked to the felly in a number of positions according to the amount of movement that is necessary to bring the wedges of the two rims into proper engagement.

In operation, assuming a tire to be locked on the wheel, as shown in Fig. 1, and an exchange of tires necessary, the finger lever 13 is turned at right angles to the position shown in Fig. 1 into the position shown in full lines in Fig. 3, the set screw 18 then registering with the extension 22 of the slot 17. The finger lever 13 is then turned down into the position shown in dotted lines in Fig. 3, drawing the teeth 23 of the bolt out of engagement with the rack. By means, such as shown in my aforesaid application, the tire rim 1 may then be turned circumferentially and removed laterally from the felly. A new tire is then slipped over the felly and turned circumferentially as far as necessary to bring the wedges into proper engagement. The finger lever 13 is then turned up from the dotted position of Fig. 3 to the position shown in full lines of Fig. 3. During this movement of the lever 13, the spring 16 forces the bolt 10 into engagement with the rack 3 and draws the surfaces 20 of the lever 13 firmly against the base of the sleeve 14. The finger lever 13 is then turned at right angles from the position shown in full lines in Fig. 3 to the position shown in Fig. 1, the set screw 18 then registering with the extension 24 of the slot 17. In this position the set screw 18 prevents the finger lever from being depressed and the bolt 10 is therefore held securely in engagement with the rack 3.

Whereas I have described one embodiment of the invention, it is obvious that the structure could be varied considerably within the scope of the invention.

Having described my invention what I claim is:

1. The combination of a fixed felly rim, a demountable rim carrying a tire, wedges on the fixed rim and on the demountable rim adapted to be brought into engagement with each other by relative circumferential movement of the one rim over the other, means whereby the rims may be given relative circumferential movement to bring the wedges into engagement, and means for locking the rims together in any one of a plurality of relative circumferential positions, the locking position in each instance being determined by the extent of the relative movement of the rims in bringing the wedges into secure engagement, said locking means consisting of a rack carried by one of the rims, a tooth carried by the other rim, and means for interlocking the tooth with one of the several teeth of the rack.

2. The combination of a fixed felly rim, a demountable rim carrying a tire, wedges on the fixed rim and on the demountable rim adapted to be brought into engagement with each other by relative circumferential movement of the one rim over the other, means whereby the rims may be given relative circumferential movement to bring the wedges into engagement, and means for locking the rims together in any one of a plurality of relative circumferential positions, the locking position in each instance being determined by the extent of the relative movement of the rims in bringing the wedges into secure engagement, said locking means consisting of a device carried by one of the rims adapted to engage with the other rim at different points of the latter.

3. The combination of a fixed felly rim, a demountable rim carrying a tire, wedges on the fixed rim and on the demountable rim adapted to be brought into engagement with each other by relative circumferential movement of the one rim over the other, means whereby the rims may be given relative circumferential movement to bring the wedges into engagement, and means for locking the rims together in any one of a plurality of relative circumferential positions, the locking position in each instance being determined by the extent of the relative movement of the rims in bringing the wedges into secure engagement, said locking means consisting of a device carried by one of the rims adapted to be forced into any one of a series of recesses in the other rim.

4. The combination of a fixed felly rim, a demountable rim carrying a tire, wedges on the fixed rim and on the demountable rim adapted to be brought into engagement with each other by relative circumferential movement of the one rim over the other, means whereby the rims may be given relative circumferential movement to bring the wedges into engagement, and means for locking the rims together in any one of a plurality of relative circumferential positions, the locking position in each instance being determined by the extent of the relative movement of the rims in bringing the wedges into secure engagement, said locking means consisting of a rack on one of the rims, a bolt on the other rim having a
5 toothed edge to engage such of the teeth of the rack as may have been made to register therewith by the movement of the rims.

Signed by me at New York city, county and State of New York, this 28th day of January 1909.

ALEXANDER DOW.

Witnesses:
 EMMA W. RENNÉ,
 F. J. ERWIN.